United States Patent [19]

Nishioka et al.

[11] Patent Number: 5,353,053
[45] Date of Patent: Oct. 4, 1994

[54] METHOD OF CORRECTING A MEASURED IMAGE FORMED BY A TELEVISION CAMERA

[75] Inventors: Tetsu Nishioka; Tetsuhisa Minami; Masakazu Okada; Masao Kawamura; Munehiro Ohshiro; Manabu Ishikawa, all of Tokyo, Japan

[73] Assignees: NEC Corporation; Nippon Avionics Co., Ltd.; Tokyu Construction Co., Ltd., all of Tokyo, Japan

[21] Appl. No.: 15,167

[22] Filed: Feb. 11, 1993

[30] Foreign Application Priority Data

Feb. 12, 1992 [JP] Japan ................... 4-058950

[51] Int. Cl.$^5$ .......................................... H04N 7/18
[52] U.S. Cl. .................................. 348/33; 348/164
[58] Field of Search .............. 358/81, 82, 107, 109, 358/113, 209, 211, 228; 348/33, 93, 164, 207, 224, 227; H04N 7/18

[56] References Cited

U.S. PATENT DOCUMENTS

| | | | |
|---|---|---|---|
| 3,748,471 | 7/1973 | Ross et al. | 358/81 |
| 4,037,048 | 7/1977 | Walker | 358/113 |
| 4,300,167 | 11/1981 | Miller et al. | 358/228 |
| 4,532,550 | 7/1985 | Bendell et al. | 358/228 |
| 4,608,596 | 8/1986 | Williams et al. | 358/81 |
| 4,638,367 | 1/1987 | Sakane et al. | 358/228 |
| 4,688,092 | 8/1987 | Kamel et al. | 358/109 |
| 4,724,354 | 2/1988 | Dill | 358/113 |
| 4,972,266 | 11/1990 | Tani | 358/228 |
| 5,081,535 | 1/1992 | Kondo et al. | 358/228 |
| 5,237,308 | 8/1993 | Nakamura | 358/113 |

OTHER PUBLICATIONS

Doulgas H. Kliman, "Detection of Seasonal Vegetation Change with Video Remote Sensing", First Workshop on Videography, American Society for Photogrammetry and Remote Sensing, May 1988, pp. 166-174.

Primary Examiner—Tommy P. Chin
Assistant Examiner—Richard Lee
Attorney, Agent, or Firm—Browdy and Neimark

[57] ABSTRACT

Spectral image signals simultaneously provided by two CCD television cameras for an R-image and an IR-image are selected by a visual controller and are sent sequentially to a sending parabolic antenna where two spectral radiometers provided with photosensors measure the amounts of radiation energy of light rays of wavelengths around a wavelength corresponding to the R-image and light rays of wavelengths around a wavelength corresponding to the IR-image to obtain spectral radiation data representing the amounts of spectral radiation energy, respectively. The measured spectral radiation data is integrated and recorded by a data logger and sent through a modem and a connection box to a sending parabolic antenna, and spectral image signals representing the R-image and the IR-image received by a receiving antenna are applied to an image processing unit and the spectral radiation data received by the receiving parabolic antenna is transferred through a connection box and a modem to a computer where an image processing unit calculates a spectral reflection ratio IR/R, where IR is a corrected spectral reflectance of light rays corresponding to the IR-image and R is a corrected spectral reflectance of light rays corresponding to the R-image, and the reflectance ratio IR/R is displayed on a television monitor.

22 Claims, 6 Drawing Sheets

METHOD OF CORRECTING A MEASURED IMAGE FORMED BY A TELEVISION CAMERA

BACKGROUND OF THE INVENTION

1. Field of the Invention

The present invention relates to a method of correcting a measured image formed by a television camera.

2. Description of the Prior Art

The inventors of the present invention are engaged in the development of techniques for taking, for example, a plant by a television camera and measuring data representing the activity of the plant, i.e., health barometers of the plant. to evaluate the activity of the plant.

The inventors of the present invention verified through measurement that the reflectance, namely, the ratio in percent of the quantity of reflected light to that of incident light, of natural light on a plant having high activity assumes a characteristic curve as shown in FIG. 10. As shown in FIG. 10, the reflectance decreases with wavelength to a minimum in a wavelength band around a wavelength of 670 nm, and then the reflectance increases sharply with wavelength to a high level in a wavelength band around a wavelength of 850 nm. Such a mode of variation of the reflectance of natural light with wavelength is inferred to be due to the absorption of most part of the incident light rays of wavelengths in an absorption band corresponding to chlorophyll and the reflection of most part of the incident light rays of wavelengths in the near infrared band.

On the other hand, the reflectance of natural light on a plant having low activity assumes a characteristic curve as shown in FIG. 11, in which the reflectance of light rays of wavelengths around a wavelength of 670 nm is slightly higher than that of the plant having high activity, and the reflectance of light rays of wavelengths around a wavelength of 850 nm is far smaller than that of the same on the plant having high activity. Such a mode of variation of reflectance of natural light on the plant having low activity with wavelength is inferred to be due to the slight increase of reflectance to red rays attributable to increase in carotenoid and the significant reduction of reflectance of light rays in the near infrared band attributable to the decomposition of chlorophyll.

The difference in reflective characteristics between the plant having high activity and the plant having low activity can definitely be determined by comparing the spectral reflection ratio IR/R, where R is the spectral reflectance of light rays of wavelengths around 670 nm on the plant having high activity and IR is the spectral reflectance of light rays of wavelengths around 850 nm on the same plant, and the spectral reflection ratio IR/R with the plant having low activity. The spectral reflection ratio IR/R with the plant having high activity is very large because R is relatively small and IR is very large, whereas the spectral reflection ratio IR/R with the plant having low activity is very small because R is relatively large and IR is relatively small. Thus, the activity of a plant can be determined from the spectral reflection ratio IR/R by taking the image of the plant by a television camera.

The amount of energy of incident solar radiation on a plant varies every hour or every season, depending on the solar altitude and conditions of clouds. Since the reflectance of solar radiation on a plant varies with the variation of the amount of energy of solar radiation, image signals provided by a television camera are affected by the variation of the amount of energy of solar radiation; that is, the image signals will vary according to the variation of the amount of energy of solar radiation even if the health condition of the plant remains constant. Accordingly, it is impossible to determine the activity of the plant correctly by simply measuring the spectral reflectance of light rays on the plant and calculating the spectral reflection ratio IR/R.

Generally, the amount of incident light on a television camera needs to be adjusted by adjusting the aperture stop by the diaphragm. The image signals are affected by the adjustment of the aperture stop. Therefore, the spectral reflection ratio obtained by processing the image signals does not represent the activity of the plant correctly if the aperture stop of the television camera is adjusted when producing the image signals.

SUMMARY OF THE INVENTION

The present invention has been made to solve the foregoing problems and it is therefore an object of the present invention to provide a method of correcting a measured image of an object to obtain an accurate evaluating image, comprising steps of simultaneously measuring an image and the amount of radiation energy radiated by a light source, and correcting image signals representing the measured image on the basis of the measured amount of radiation energy or on the basis of the aperture stop to extract only the data representing the activity of the object.

A measured image correcting method in accordance with the present invention obtains spectral image signals by detecting reflected light rays of wavelengths in specified wavelength bands among light rays reflected by an object by a television camera, measures the amount of spectral radiation energy of light rays of wavelengths in the specified wavelength band radiated by a light source, and obtains an evaluating image by correcting the spectral image signals on the basis of the amount of spectral radiation energy.

It is also a feature of the present invention to obtain an evaluating image by correcting the spectral image signals on the basis of the aperture stop of the television camera.

The corrected spectral image signals are subjected to a pseudo-color image processing.

It is a further feature of the present invention to determine the activity of the object by measuring the reflectance R of light rays of wavelengths in one wavelength band on the object and the reflectance IR of light rays of wavelengths in another wavelength band on the object, measuring the amounts of spectral radiation energy of light rays in those two wavelength bands, correcting the spectral image signals on the basis of the amounts of radiation energy, and calculating a spectral reflection ratio IR/R or $(IR-R)/(IR+R)$. The spectral reflectance R is the spectral reflectance of light rays of wavelengths, for example, in the range of 600 to 700 nm, and the spectral reflectance IR is the spectral reflectance of light rays of wavelengths, for example, in the range of 700 to 900 nm.

The spectral image signals are transmitted to a remote processing unit by radio transmission or cable transmission, or recorded on a video tape or a magnetooptic disk and reproduced by a processing means.

The present invention brings about the following advantages.

1) Correction of the measured image signals according to the amount of spectral radiation energy radiated by the light source provides an accurate evaluating image unaffected by the condition of the light source.

2) Correction of the measured image signals according to the aperture stop of the television camera eliminates the influence of the aperture stop on the measurement.

3) Only the information concerning the activity of a plant can be extracted from the measured image of the plant illuminated by a light source the radiation energy of which varies every moment, such as the sun.

4) The growth of the grass of a golf course can objectively be estimated for effective green keeping management.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE EMBODIMENTS

Figure 1:
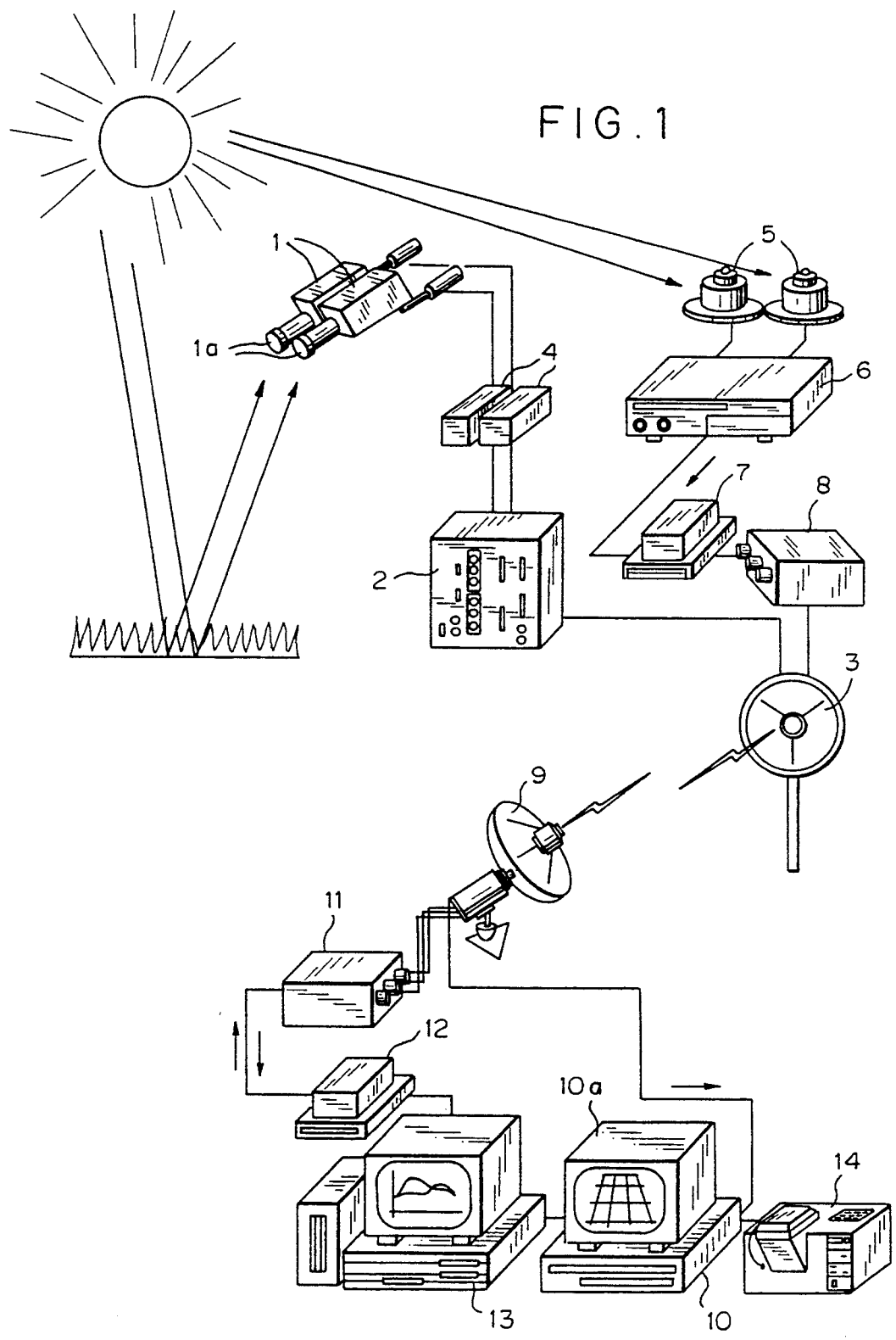
FIG. 1 is a pictorial view of a measured image correcting system suitable for carrying out a measured image correcting method in a preferred embodiment according to the present invention.
Figure 3:
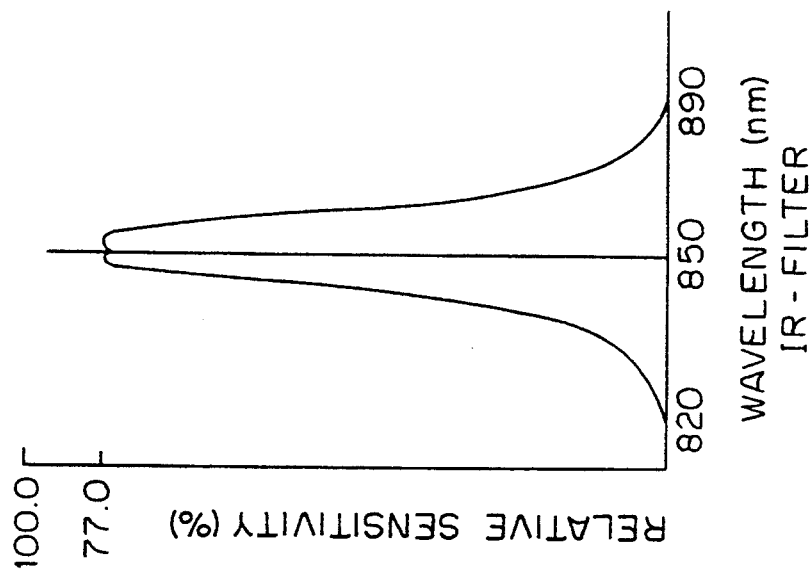
FIG. 3 is a graph showing the characteristics of an IR-filter.
Figure 2:
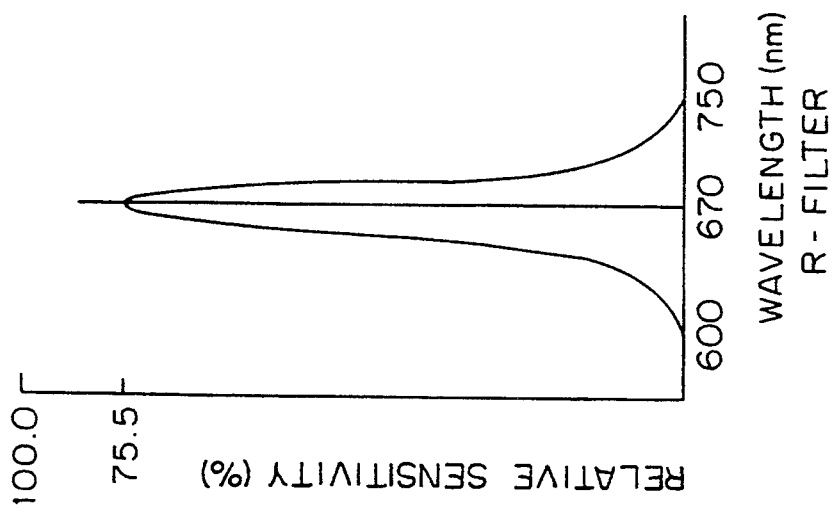
FIG. 2 is a graph showing the characteristics of an R-filter.

Referring to FIG. 1 showing a measured image correcting system for carrying out a measured image correcting method in a preferred embodiment according to the present invention, two monochromatic CCD television cameras 1 have lenses 1a provided with band-pass filters, not shown, respectively. One of the band-pass filters is a filter having a maximum sensitivity (75.5%) to light rays of 670 nm in wavelength as shown in FIG. 2 and capable of transmitting light rays of wavelengths in the range of 600 to 750 nm, which will be referred to as "R-filter", for obtaining the density data of reflected light rays of wavelengths around 670 nm as the luminance signal of an R-image.

The other band-pass filter is a filter having a maximum sensitivity (77%) to light rays of 850 nm in wavelength and capable of transmitting light rays of wavelengths in the range of 820 to 890 nm, which will be referred to as "IR-filter", for obtaining the density data of reflected light rays of wavelengths around 850 nm as the luminaace signal of an IR-image. Each of the band-pass filters may be disposed in front of the CCD device, not shown, of the CCD television camera.

Spectral image signals (luminance signals) simultaneously provided by the CCD television cameras 1 for an R-image and an IR-image are selected by a visual controller 2 and are sent sequentially to a sending parabolic antenna 3. In FIG. 1, indicated at 4 are power sources, such as solar batteries.

The amount of solar radiation energy, i.e., amount of incident light, is measured by two spectral radiometers 5 provided with an R-filter and an IR-filter, respectively. The spectral radiometers 5 obtain spectral radiation data representing the amount of spectral radiation energy by measuring the amount of radiation energy of light rays of wavelengths around 670 nm corresponding to the R-image and the amount of radiation energy of light rays of wavelengths around 850 nm by photosensors, such as photodiodes, respectively. The spectral radiation data measured by the spectral radiometers 5 are integrated and recorded by a data logger 6, and then the spectral radiation data are transferred through a MODEM 7 and a connection box 8 to the sending parabolic antenna 3. Then, the sending parabolic antenna 3 transmits, for example, millimetric waves carrying the spectral image signals representing the IR-image and the R-image, and the spectral radiation data signals.

A receiving parabolic antenna 9 receives the data signals transmitted by radio transmission by the sending parabolic antenna 3. Then, the data signals representing the spectral image signals of the IR-image and the R-image are applied to an image processing unit 10. Then, the image processing unit 10 converts the data signals into digital signals of CCT (computer compatible tape) values of 256 steps in the range of 0 to 255.

The spectral radiation data signals received by the receiving parabolic antenna 9 are applied through a connection box 11 and a MODEM 12 to a computer 13.

Figure 4:
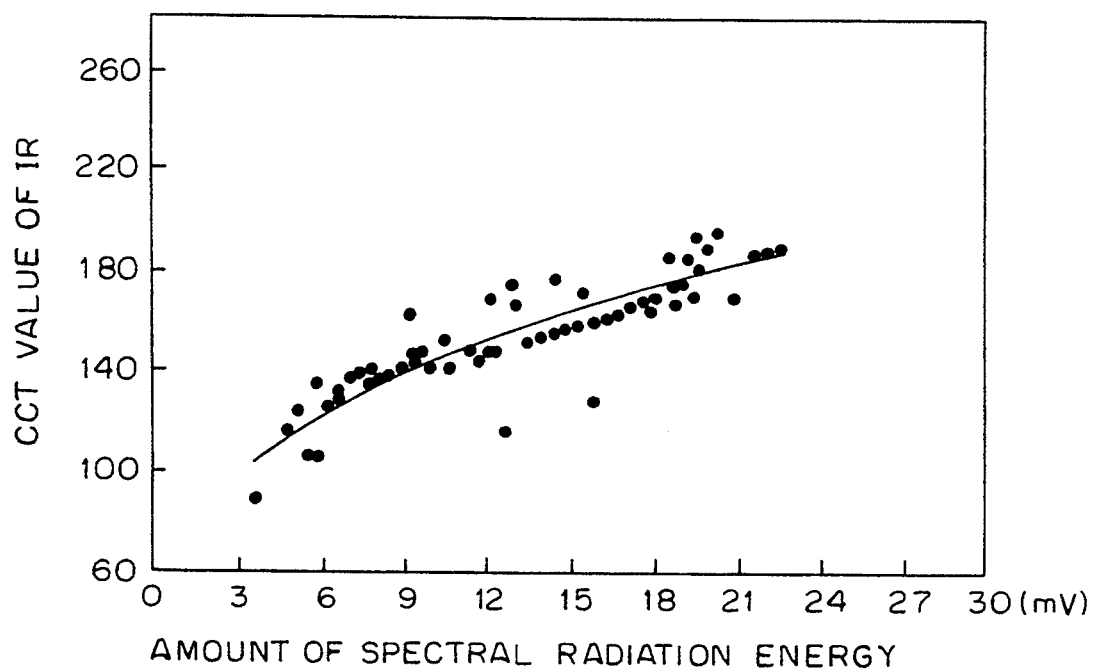
FIG. 4 is a graph showing the relation between the amount of spectral radiation energy and the CCT value of spectral reflectance IR.
Figure 5:
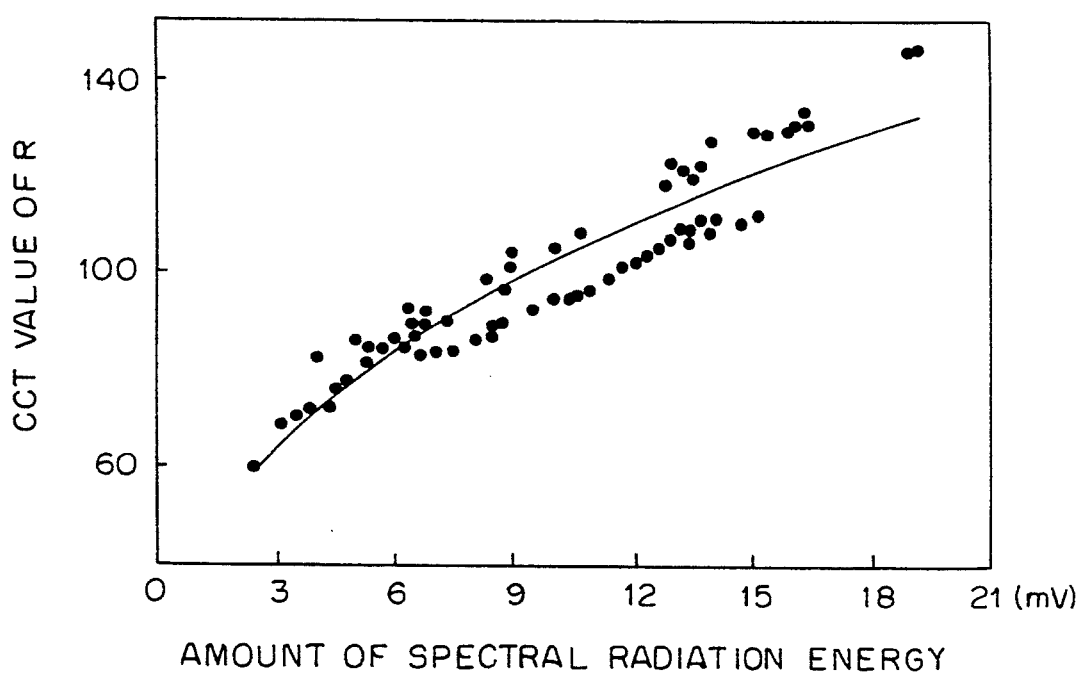
FIG. 5 is a graph showing the relation between the amount of spectral radiation energy and the CCT value of spectral reflectance R.

As shown in FIGS. 4 and 5, the CCT values of the spectral reflectance IR and the amount of spectral radiation, and the CCT values of the spectral reflectance R and the amount of spectral radiation are mutually related with each other, respectively.

Figure 6:
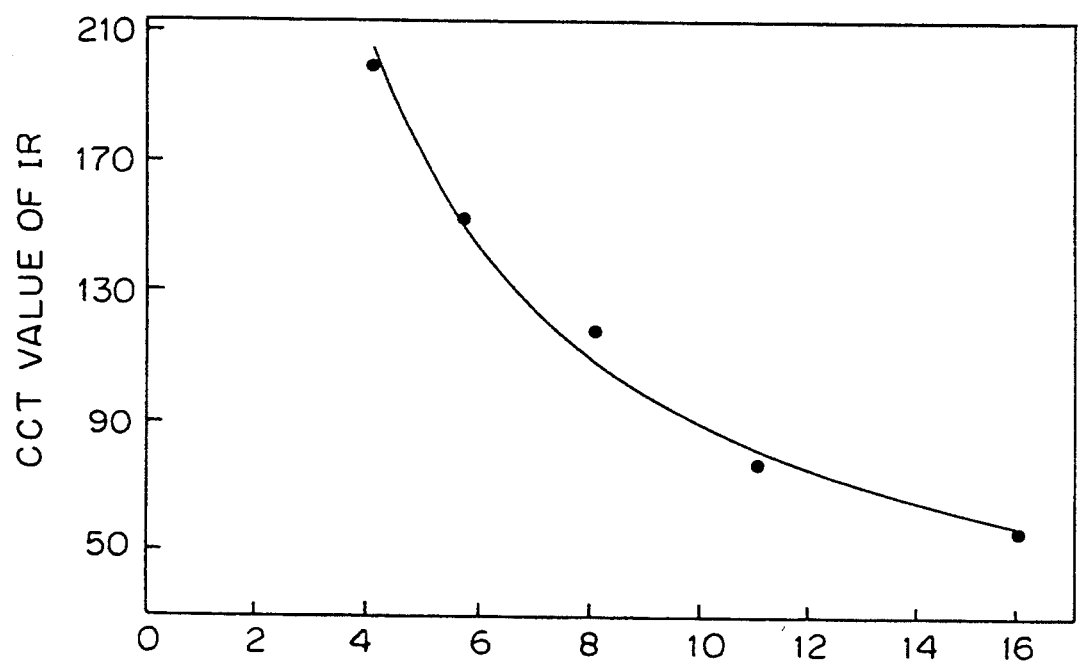
FIG. 6 is a graph showing the relation between aperture stop and the CCT value of the spectral reflectance IR.
Figure 7:
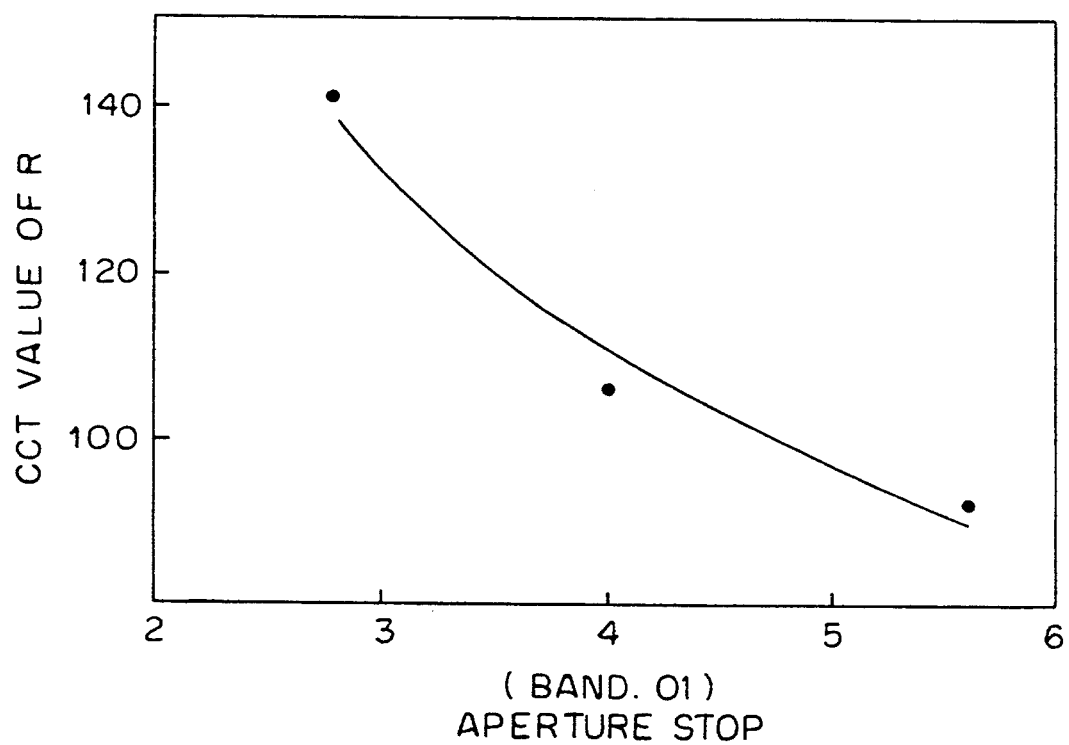
FIG. 7 is a graph showing the relation between aperture stop and the CCT value of the spectral reflectance R.
Figure 8:
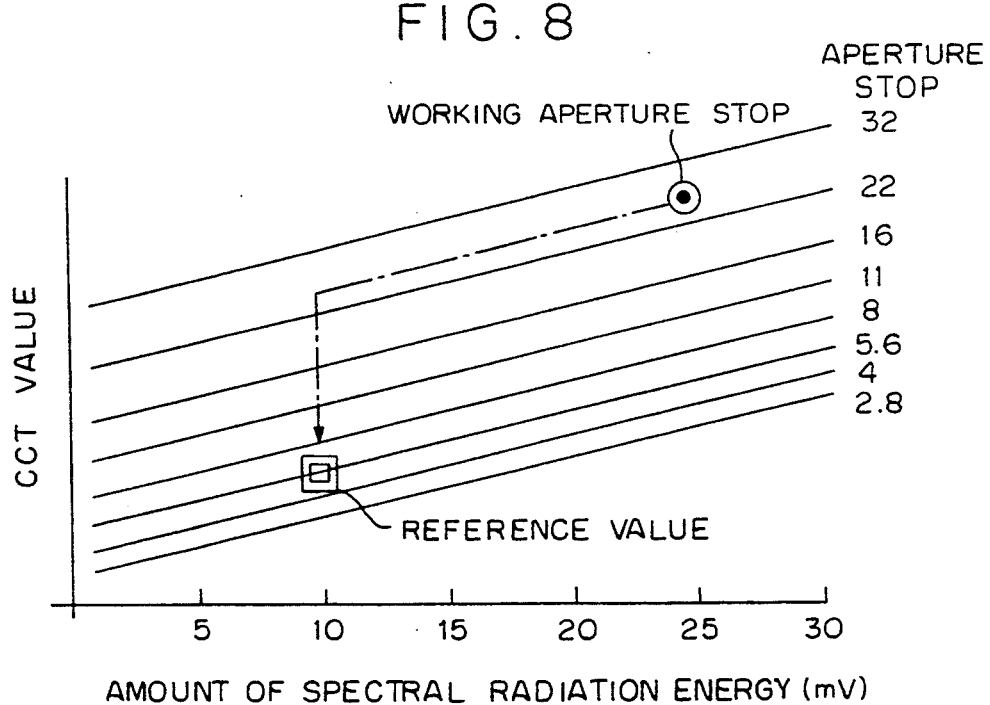
FIG. 8 is a graph showing the relation between amount of spectral radiation energy-and CCT value for different aperture stops.

Information representing the aperture stop of the CCD television camera is given to the computer 13. As shown in FIGS. 6 and 7, the aperture stop and the spectral reflectance IR, and the aperture stop and the spectral reflectance R are mutually related with each other, respectively.

Since there are correlations between the amount of spectral radiation energy, the aperture stop and the respective CCT values of the spectral reflectance IR and the spectral reflectance R, the IR-image and the R-image obtained under an amount of spectral radiation energy and an aperture stop are subjected to incident light correction and aperture stop correction to obtain CCT values for a reference amount of incident light and a reference aperture stop. The image processing unit 10 calculates a spectral reflection ratio IR/R using the corrected spectral reflectances IR and R, and displays the calculated spectral reflection ratio IR/R on a monitor television set 10a. The spectral reflection ratio IR/R is subjected to pseudo-color image processing for a specific color tone to enable the visual evaluation of the spectral reflection ratio IR/R, i.e., the activity of the plant, by color difference. The position of the evaluating image of the spectral reflection ratio IR/R can be determined by displaying a monitor color picture in addition to the processed evaluating image.

The computer 13 sends a control signal to the receiving parabolic antenna 9 to direct the receiving parabolic antenna 9 toward the sending parabolic antenna 3. Thus, image data can be received in a real-time receiving mode by directing the receiving parabolic antenna 9 selectively toward a plurality of sending parabolic antennas 3 disposed respectively at different measuring points. In FIG. 1, indicated at 14 is a film recorder.

Figure 9:
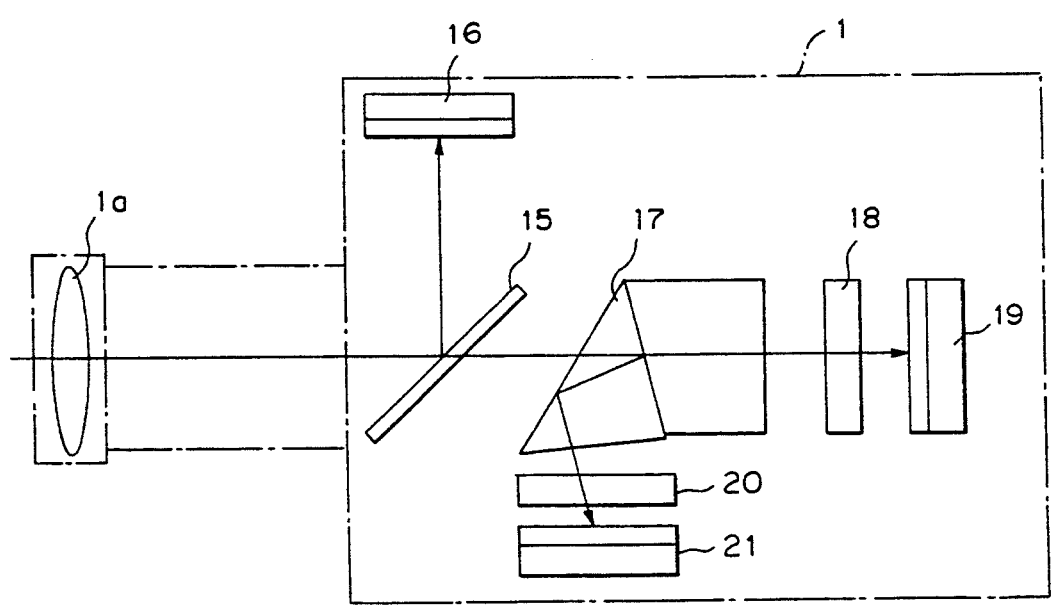
FIG. 9 is a diagrammatic view of a spectral taking mechanism included in a CCD camera.
Figure 11:
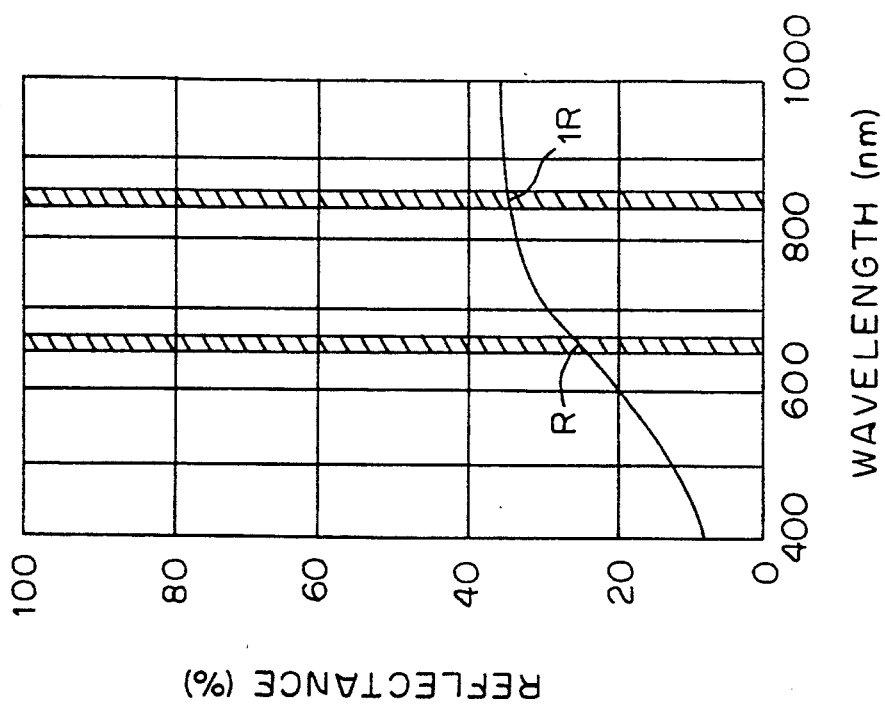
FIG. 11 is a graph showing the dependence of the reflectance of natural light on wavelength on a plant having low activity.
Figure 10:
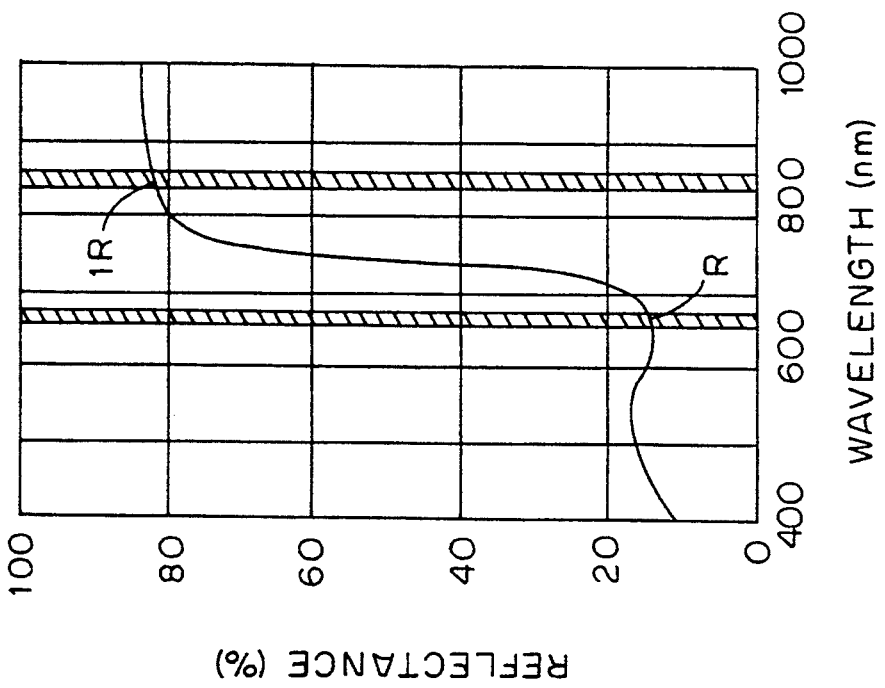
FIG. 10 is a graph showing the dependence of the reflectance of natural light on wavelength on a plant having high activity.

FIG. 9 shows a CCD television camera 1 capable of simultaneously obtaining an R-image and an IR-image, included in another measured image correcting system for carrying out the present invention. In taking a plant by the CCD television camera 1, part of reflected light rays reflected by a plant and transmitted through a lens 1a is reflected by a dichroic mirror 15 and falls on a CCD device 16 for forming a color image. The reflected light rays transmitted through the dichroic mirror 15 are decomposed by a prism 17. Then, light rays of wavelengths around 670 nm passes a band-pass filter 18 and fall on a CCD device 19 to form an R-image, and light rays of wavelengths around 850 nm passes a band-pass filter 20 and fall on a CCD device 21 to form an IR-image.

The measured image correcting method in accordance with the present invention is applicable to management for maintaining the putting greens of a golf course; the condition of the grass of putting greens of a golf course is monitored by CCD television cameras, information concerning the condition of the grass of the putting greens obtained by the CCD television cameras is sent to a remove management office, the activity of the grass is determined in a real-time mode from the information, and suitable fertilizer, agricultural chemicals and/or water is sprayed over the grass having low activity to activate the grass. The information obtained by the CCD television camera may be transmitted by either radio transmission or cable transmission.

The light source need not necessarily be the sun; the light source may be an artificial light source provided that the amount of radiation energy radiated by the artificial light source varies. The present invention is applicable to measuring the variation of the spectral reflectance of any object as well as to measuring the variation of the spectral reflectance of plants. The activity of plants may be evaluated from (IR - R)/(IR + R) instead of the spectral reflection ratio IR/R.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A measured image correcting method comprising the steps of
    obtaining spectral image signals with a television camera for detecting wavelengths of reflected light rays in specified wavelength bands among reflected light rays reflected by an object;
    measuring an amount of spectral radiation energy of the wavelengths of reflected light rays in one of said specified wavelength bands emitted by a light source simultaneously with the detection of the wavelengths of the reflected light rays in another of said specified wavelength bands by the television camera;
    measuring the size of an aperture stop of the television camera;
    and obtaining an evaluating image by electronically correcting the spectral image signals according to the measured amount of spectral radiation energy and the measured size of the aperture stop.

2. The measured image correcting method according to claim 1 wherein
    data signals including the spectral image signals and the amount of spectral radiation energy are transmitted to a remote data processing means by electronic transmission means.

3. The measured image correcting method according to claim 1 wherein
    data signals including the spectral image signals and the amount of spectral radiation energy are recorded on a storage medium, and the data signals are reproduced by a data processing means.

4. The measured image correcting method according to claim 1 wherein
    the corrected spectral image signals are subjected to a pseudo-color image processing.

5. The measured image correcting method according to claim 4 wherein
    data signals including the spectral image signals and the amount of spectral radiation energy are transmitted to a remote data processing means by electronic transmission means.

6. The measured image correcting method according to claim 4 wherein
    data signals including the spectral image signals and the amount of spectral radiation energy are recorded on a storage medium, and the data signals are reproduced by a data processing means.

7. The measured image correcting method according to claim 1 wherein the activity of a plant is determined by
    obtaining the spectral image signals by detecting a spectral reflectance R of light rays of wavelengths in a first wavelength band reflected by the plant and a spectral reflectance IR of light rays of wavelengths in a second wavelength band reflected by the plant;
    measuring the amount of radiation energy of the light rays of wavelengths in the first wavelength band radiated by the light source and that of the light rays of wavelengths in the second wavelength band radiated by the light source;
    correcting the spectral reflectances R and IR, respectively, according to corresponding amounts of spectral radiation energy;
    calculating a spectral reflection ratio IR/R using the corrected spectral reflectances R and IR;
    and evaluating the activity of the plant from the spectral reflection ratio IR/R.

8. The measured image correcting method according to claim 7 wherein
    data signals including the spectral image signals and the amount of spectral radiation energy are transmitted to a remote data processing means by electronic transmission means.

9. The measured image correcting method according to claim 7 wherein
data signals including the spectral image signals and the amount of spectral radiation energy are recorded on a storage medium, and the data signals are reproduced by a data processing means.

10. The measured image correcting method according to claim 7 wherein
the first wavelength band is a continuous range of wavelengths extending between 600 nm to 700 nm, and the second wavelength band is a continuous range of wavelengths extending between 700 nm to 900 nm.

11. The measured image correcting method according to claim 10 wherein
the corrected spectral reflectances are subjected to a pseudo-color image processing.

12. The measured image correcting method according to claim 7 wherein
the corrected spectral reflectances are subjected to a pseudo-color image processing.

13. The measured image correcting method according to claim 12 wherein
data signals including the spectral image signals and the amount of spectral radiation energy are transmitted to a remote data processing means by electronic transmission means.

14. The measured image correcting method according to claim 12 wherein
data signals including the spectral image signals and the amount of spectral radiation energy are recorded on a storage medium, and the data signals are reproduced by a data processing means.

15. The measured image correcting method according to claim 1 wherein the activity of a plant is determined by
obtaining the spectral image signals by detecting a spectral reflectance R of light rays of wavelengths in a first wavelength band reflected by the plant and a spectral reflectance IR of light rays of wavelengths in a second wavelength band reflected by the plant;
measuring the amount of radiation energy of the light rays of wavelengths in the first wavelength band radiated by the light source and that of the light rays of wavelengths in the second wavelength band radiated by the light source;
correcting the spectral reflectances R and IR, respectively, according to corresponding amounts of spectral radiation energy;
calculating a spectral reflection ratio $(IR-R)/(IR+R)$ using the corrected spectral reflectances R and IR;
and evaluating the activity of the plant from the spectral reflection ratio $(IR-R)/(IR+R)$.

16. The measured image correcting method according to claim 15 wherein
data signals including the spectral image signals and the amount of spectral radiation energy are transmitted to a remote data processing means by electronic transmission means.

17. The measured image correcting method according to claim 15 wherein
data signals including the spectral image signals and the amount of spectral radiation energy are recorded on a storage medium, and the data signals are reproduced by a data processing means.

18. The measured image correcting method according to claim 15 wherein
the first wavelength band is a continuous range of wavelengths extending between 600 nm to 700 nm, and the second wavelength band is a continuous range of wavelengths extending between 700 nm to 900 nm.

19. The measured image correcting method according to claim 18 wherein
the corrected spectral reflectances are subjected to a pseudo-color image processing.

20. The measured image correcting method according to claim 15 wherein
the corrected spectral reflectances are subjected to a pseudo-color image processing.

21. The measured image correcting method according to claim 20 wherein
data signals including the spectral image signals and the amount of spectral radiation energy are transmitted to a remote data processing means by electronic transmission means.

22. The measured image correcting method according to claim 20 wherein
data signals including the spectral image signals and the amount of spectral radiation energy are recorded on a storage medium, and the data signals are reproduced by a data processing means.

* * * * *